United States Patent [19]

Stückle

[11] Patent Number: 5,564,734
[45] Date of Patent: Oct. 15, 1996

[54] DOOR MOUNTED AIR BAG ASSEMBLY

[75] Inventor: Gerd Stückle, Hildrizhausen, Germany

[73] Assignee: Mercedes-Benz AG, Germany

[21] Appl. No.: 434,394

[22] Filed: May 3, 1995

[30] Foreign Application Priority Data

May 3, 1994 [DE] Germany .......................... 44 15 469.0

[51] Int. Cl.⁶ .................................................. B60R 21/22
[52] U.S. Cl. .................................. 280/730.2; 280/728.1
[58] Field of Search ............................. 280/730.1, 730.2, 280/728.1, 743.1

[56] References Cited

U.S. PATENT DOCUMENTS 5,312,131  5/1994  Kitagawa et al. .................... 280/730.2

FOREIGN PATENT DOCUMENTS

| 2061218 | 6/1971 | France . | |
|---|---|---|---|
| 2146258 | 3/1972 | Germany . | |
| 9216516 | 4/1993 | Germany . | |
| 9303231.5 | 7/1993 | Germany . | |
| 4-110252 | 4/1992 | Japan | 280/730.1 |
| 5-32149 | 2/1993 | Japan | 280/730.2 |
| 2263888 | 8/1993 | United Kingdom . | |

*Primary Examiner*—Paul N. Dickson
*Attorney, Agent, or Firm*—Evenson, McKeown, Edwards & Lenahan P.L.L.C.

[57] ABSTRACT

A vehicle airbag restraint system for vehicles has an inflatable airbag which is deployed in its inflated protective position between a seated occupant and a large vehicle component. The front side of the airbag is guided during the inflating process by a supporting mating surface of the vehicle component, which extends in the vertical and horizontal directions of the vehicle. In its collapsed inoperative position the airbag is arranged at a small distance from the mating surface of the vehicle component, to the side of the seating space, at the level of the mating surface, and can be inflated transversely with respect to the direction of travel of the vehicle, along the mating surface into its deployed protective position.

9 Claims, 1 Drawing Sheet

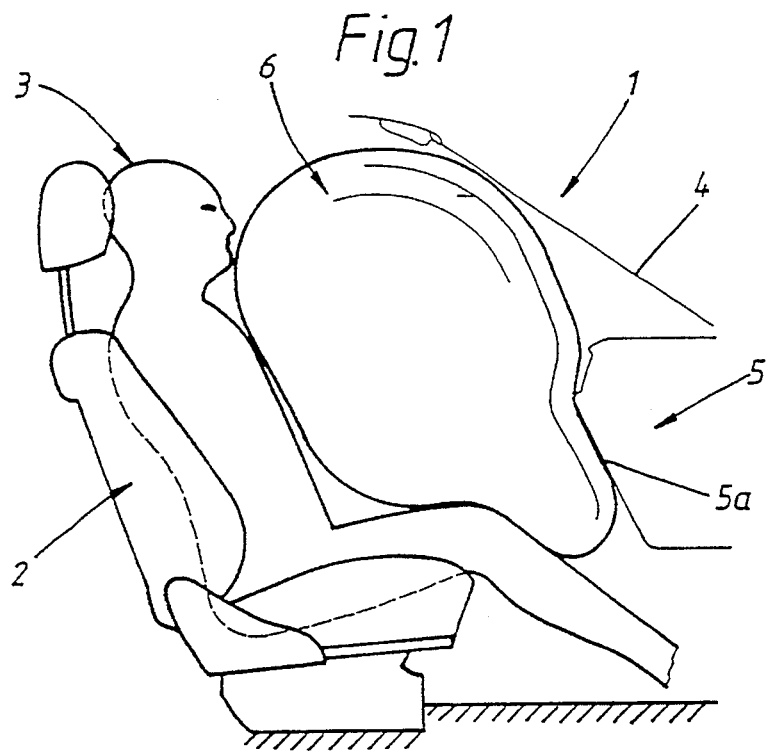
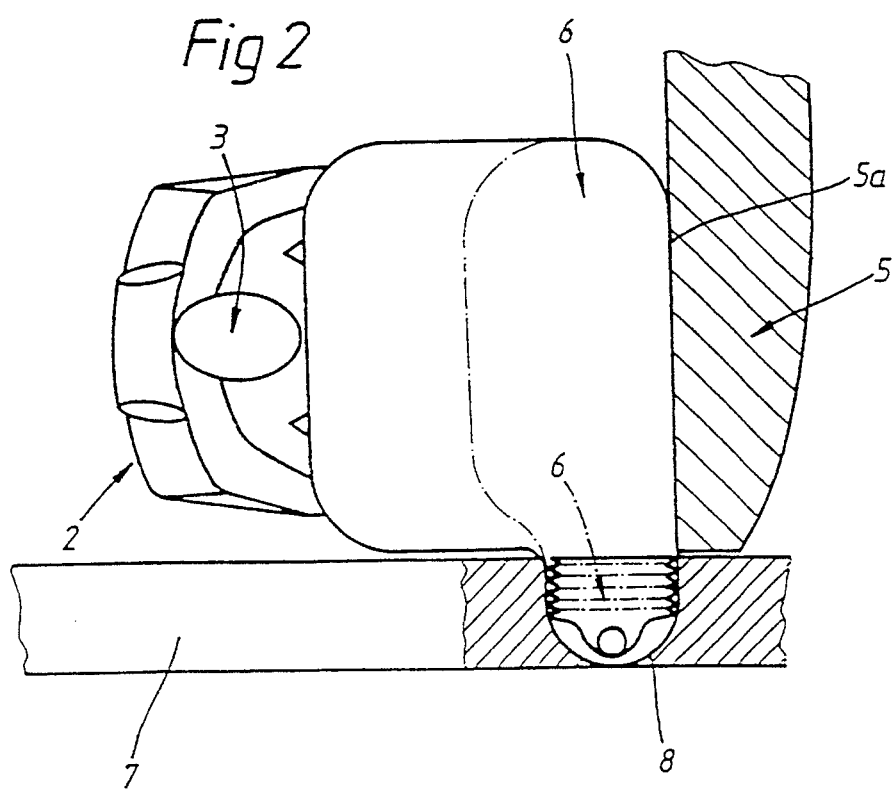

DOOR MOUNTED AIR BAG ASSEMBLY

BACKGROUND AND SUMMARY OF THE INVENTION

The invention relates to a vehicle airbag restraint system for vehicles, of the type in which the airbag is adapted to the interior contour of the vehicle.

A restraint system of this generic type is disclosed, for example, in German patent document DE-OS 21 46 258, in which the generator housing, which accommodates the collapsed airbag, is arranged in the knee-impact region below a dashboard. This measure advantageously allows a roomy glove compartment or a similar tray to be integrated on the passenger side into the dashboard, since the space is not taken up by an airbag recessed in the dashboard. Furthermore, the airbag is inflatable in two stages, a lower chamber of the partially inflated airbag first of all resting on the thigh of the occupant before inflation of the upper chamber, which restrains the upper part of the occupant's body.

However, the arrangement of the generator housing in the knee area, which can considerably impair the space conditions, is to be regarded as a disadvantageous feature of the known restraint system.

German patent document DE-PS 93 03 231 U1 on the other hand discloses a restraint system for vehicles which does not impair the knee room of a motor vehicle. In this case a gas generator with an inflatable airbag is arranged in the seat cushion of the vehicle seat itself, and during the inflating process the airbag emerges from a lateral opening of the seat cushion. Due to the arrangement of the airbag in the seat cushion, however, it is situated at an insufficient distance in front of the upper part of the occupant's body. In contrast to the airbag of the generic restraint system, the protective function of the airbag can hence at best be realized when the occupant has his or her seatbelt on. Moreover, because of the bend in the inflated airbag, which is guided during the inflating process by the door lining, the airbag has a considerable excess length, which excessively prolongs the inflation time. This can be problematic even when the occupant has his/her seatbelt on.

One object of the present invention, therefore, is to provide a restraint system of the generic type, in which the arrangement of the airbag does not impair the space conditions in the knee room allocated to the seating space.

This object is achieved according to the invention by stowing the uninflated airbag in a recess in the vehicle door, in the knee region of a vehicle occupant. Upon the occurrence of a collision, the airbag inflates in a direction transverse to the direction of travel of the vehicle, filling the space immediately forward of the vehicle occupant.

Other objects, advantages and novel features of the present invention will become apparent from the following detailed description of the invention when considered in conjunction with the accompanying drawings.

BRIEF DESCRIPTION OF THE DRAWINGS

FIG. 1 shows a diagrammatic side view of a passenger seating space with an inflated airbag; and FIG. 2 shows the arrangement of the airbag in plan view.

DETAILED DESCRIPTION OF THE DRAWINGS

A motor vehicle 1, only the front passenger-compartment region of which is shown, can be seen in FIG. 1 from the passenger side, with an occupant 3 in a sitting position in the front, right-hand vehicle seat 2. At a distance in front of the occupant 3 there extend in the normal manner a windshield 4, which is inclined rearwards, and a dashboard 5 which is arranged below the latter and which could be struck by the occupant 3 if he or she is hurled forwards in a frontal collision of the motor vehicle 1.

To prevent the occupant 3 from striking against the windshield 4 or dashboard 5, an airbag 6 is provided which, in the inflated condition shown, substantially fills the passenger compartment of the motor vehicle 1, between the front body side of the occupant 3 and the windshield 4 as well as that side of the dashboard 5 which faces the occupant 3. Seen in plan view (FIG. 2) this airbag 6 has an approximately pear-shaped hollow cross-section, with the upper, fatter volume region bearing against the windshield 4 and with its rear bag side against the rib cage of the occupant 3 toward the rear. The front side of the lower, correspondingly tapered volume region of the airbag 6 bears on a plane mating surface 5a of the dashboard 5, while the rear side bears against the knee region of the occupant 3. The concave curvature of the rear bag side advantageously supports the knee region, which support furthermore extends over part of the thighs and lower legs of the occupant 3. The mating surface 5a starts from the lower edge of the dashboard 5, and extends at an inclination in a plane directed obliquely upwards to the rear as far as an upper region of the dashboard 5, after which it merges into a control surface inclined obliquely forwards.

As can be seen in FIG. 2, the mating surface 5a serves as a guide surface which guides the tapered volume region on the front side of the bag during the inflating process, whilst simultaneously supporting it in the axial direction. This is possible because in its collapsed inoperative position the airbag 6 is accommodated in a recess in the side door 7 next to the vehicle seat 2. In this arrangement, the outlet opening of a gas generator 8 lies immediately aft of the mating surface 5a as soon as the side door 7 is closed. The outlet opening of the gas generator 8 can, of course, be concealed in a known manner behind a flap arrangement. After a pyrotechnic propellant in the gas generator 8 has been ignited, the flap can be broken open by the displacement pressure of the combustion gas inflating the airbag 6.

As also shown in FIG. 2, seen from above, the airbag 6 assumes an L shape in its inflated protective position. So that the axial advance of the airbag 6 along the mating surface 5a guiding it cannot be inhibited during inflation, the tapered chamber region, which is guided by the mating surface 5a, is preferably inflated first, whilst the more voluminous chamber region is inflatable only in a second phase.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Restraint system for vehicles with an inflatable airbag which is held in its inflated protective position between an occupant of a vehicle seat of a vehicle and a large vehicle component, with the front side of the airbag being guided during the inflating process by means of a supporting mating surface of the vehicle component, the mating surface of the vehicle component extending in the vertical and horizontal directions of the vehicle, and in its collapsed inoperative position the airbag is arranged at a small distance from the mating surface of the vehicle component, wherein:

in its uninflated position the airbag is arranged to the side of said vehicle seat adjacent said mating surface and at a level of a supporting seat cushion of said vehicle seat, and can be inflated along the mating surface into its deployed protective position; and said airbag when inflated has a contour which, viewed from a side of said vehicle, is generally pear shaped, with a lower relatively less voluminous tapered portion and an upper relatively fatter portion, and viewed from above said vehicle, has a generally L-shaped contour, with said lower portion extending laterally from said storing means in a direction perpendicular to a longitudinal axis of said vehicle to occupy an area adjacent knees of the occupant of said vehicle seat, and said upper portion extending generally in a direction parallel to the longitudinal axis of said vehicle and inclined upward to occupy an area adjacent a torso of an occupant of said vehicle seat.

2. Restraint system according to claim 1 wherein in its collapsed inoperative position the airbag is arranged in a side door of the vehicle, the mating surface being a surface of a dashboard of the vehicle, which surface is inclined obliquely rearwards.

3. Restraint system according to claim 2 wherein the mating surface of the dashboard extends downward as far as a knee area which is in the vicinity of knees of said occupant.

4. Restraint system according to claim 3 wherein in its inoperative position the airbag is arranged next to said knee area directly aft of the mating surface.

5. A vehicle restraint system comprising
an inflatable protective air bag; and
storing means for storing said air bag in an uninflated state in a location laterally adjacent a supporting seat cushion of a vehicle seat of a vehicle;

said airbag when inflated having a contour which, viewed from a side of said vehicle, is generally pear shaped, with a lower relatively less voluminous tapered portion and an upper relatively fatter portion, and viewed from above said vehicle, has a generally L-shaped contour, with said lower portion extending laterally from said storing means in a direction perpendicular to a longitudinal axis of said vehicle to occupy an area adjacent knees of an occupant of said vehicle seat, and said upper potion extending generally in a direction parallel to the longitudinal axis of said vehicle and inclined upward to occupy an area adjacent a torso of an occupant of said vehicle seat.

6. A vehicle restraint system according to claim 5 wherein said pear shaped contour of said airbag has a concave surface portion adapted to be adjacent knees and thighs of an occupant of said vehicle seat.

7. A vehicle restraint system according to claim 5 wherein said storing means is situated directly aft of a mating surface which supports and guides said airbag during an inflation thereof.

8. A vehicle restraint system according to claim 7 wherein said mating surface is a surface of a dashboard of said vehicle, which surface is inclined obliquely rearwards.

9. A vehicle restraint system according to claim 5 wherein said storing means is situated in a side door of said vehicle.

* * * * *